(12) United States Patent
Al-Amin

(10) Patent No.: US 6,637,378 B1
(45) Date of Patent: Oct. 28, 2003

(54) HEATER CORE PREHEATER

(76) Inventor: Wayel Al-Amin, 6456 Stead Man, Dearborn, MI (US) 48126

( * ) Notice: Subject to any disclaimer, the term of this patent is extended or adjusted under 35 U.S.C. 154(b) by 0 days.

(21) Appl. No.: 09/815,703

(22) Filed: Mar. 23, 2001

(65) Prior Publication Data (65)

(51) Int. Cl.⁷ .................................................. F22B 1/16
(52) U.S. Cl. ........................... 122/28; 165/42; 219/205
(58) Field of Search ..................... 122/28; 126/350 A; 165/41, 42; 219/205; 432/209, 210; 237/12.3 B

(56) References Cited

U.S. PATENT DOCUMENTS

| | | |
|---|---|---|
| 3,888,412 A | 6/1975 | Lindo |
| 3,970,247 A * | 7/1976 | Keeling et al. ........ 237/12.3 B |
| 4,512,324 A * | 4/1985 | Neary ........................ 219/205 |
| 4,575,003 A | 3/1986 | Linker et al. |
| 4,700,047 A * | 10/1987 | Crossett et al. ............. 219/205 |
| 4,844,029 A * | 7/1989 | Suzuki ........................ 219/205 |
| 4,862,951 A | 9/1989 | Muller et al. |
| 4,991,644 A * | 2/1991 | Miaoulis et al. ............... 165/41 |
| 5,123,594 A * | 6/1992 | Humburg ............... 237/12.3 B |
| 5,183,099 A | 2/1993 | Bechu |
| 5,522,453 A | 6/1996 | Green |
| D386,561 S | 11/1997 | Campbell |

* cited by examiner

Primary Examiner—Gregory Wilson

(57) ABSTRACT

A heater core preheater for allowing a user to quickly and efficiently receive heat in a vehicle in cold weather conditions. The heater core preheater includes a housing that has a body portion such that the housing is adapted for coupling to a heater hose between an engine of the vehicle and an inlet of the heater core of the vehicle. A heating element is coupled within the housing such that the heating element is adapted for heating fluid flowing through the heater hose to the heater core. A switch is operationally coupled between the heating element and a power source of the vehicle such that actuation by the user of the switch provides the heating element with power.

9 Claims, 5 Drawing Sheets

HEATER CORE PREHEATER

BACKGROUND OF THE INVENTION

1. Field of the Invention

The present invention relates to heater core preheaters and more particularly pertains to a new heater core preheater for allowing a user to quickly and efficiently receive heat in a vehicle in cold weather conditions.

2. Description of the Prior Art

The use of heater core preheaters is known in the prior art. More specifically, heater core preheaters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,575,003; 4,862,951; 5,183,099; 5,522,453; 3,888,412; Des. 386,561.

While these devices fulfill their respective, particular objectives and requirements, the aforementioned patents do not disclose a new heater core preheater. The inventive device includes a housing that has a body portion such that the housing is adapted for coupling to a heater hose between an engine of the vehicle and an inlet of the heater core of the vehicle. A heating element is coupled within the housing such that the heating element is adapted for heating fluid flowing through the heater hose to the heater core. A switch is operationally coupled between the heating element and a power source of the vehicle such that actuation by the user of the switch provides the heating element with power.

In these respects, the heater core preheater according to the present invention substantially departs from the conventional concepts and designs of the prior art, and in so doing provides an apparatus primarily developed for the purpose of allowing a user to quickly and efficiently receive heat in a vehicle in cold weather conditions.

SUMMARY OF THE INVENTION

In view of the foregoing disadvantages inherent in the known types of heater core preheaters now present in the prior art, the present invention provides a new heater core preheater construction wherein the same can be utilized for allowing a user to quickly and efficiently receive heat in a vehicle in cold weather conditions.

The general purpose of the present invention, which will be described subsequently in greater detail, is to provide a new heater core preheater apparatus and method which has many of the advantages of the heater core preheaters mentioned heretofore and many novel features that result in a new heater core preheater which is not anticipated, rendered obvious, suggested, or even implied by any of the prior art heater core preheaters, either alone or in any combination thereof.

To attain this, the present invention generally comprises a housing that has a body portion such that the housing is adapted for coupling to a heater hose between an engine of the vehicle and an inlet of the heater core of the vehicle. A heating element is coupled within the housing such that the heating element is adapted for heating fluid flowing through the heater hose to the heater core. A switch is operationally coupled between the heating element and a power source of the vehicle such that actuation by the user of the switch provides the heating element with power.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heater core preheater apparatus and method which has many of the advantages of the heater core preheaters mentioned heretofore and many novel features that result in a new heater core preheater which is not anticipated, rendered obvious, suggested, or even implied by any of the prior art heater core preheaters, either alone or in any combination thereof.

It is another object of the present invention to provide a new heater core preheater, which may be easily and efficiently manufactured and marketed.

It is a further object of the present invention to provide a new heater core preheater, which is of a durable and reliable construction.

An even further object of the present invention is to provide a new heater core preheater which is susceptible of a low cost of manufacture with regard to both materials and labor, and which accordingly is then susceptible of low prices of sale to the consuming public, thereby making such heater core preheater economically available to the buying public.

Still yet another object of the present invention is to provide a new heater core preheater which provides in the apparatuses and methods of the prior art some of the advantages thereof, while simultaneously overcoming some of the disadvantages normally associated therewith.

Still another object of the present invention is a new heater core preheater for allowing a user to quickly and efficiently receive heat in a vehicle in cold weather conditions.

Yet another object of the present invention is to provide a new heater core preheater which includes a housing that has a body portion such that the housing is adapted for coupling to a heater hose between an engine of the vehicle and an inlet of the heater core of the vehicle. A heating element is coupled within the housing such that the heating element is adapted for heating fluid flowing through the heater hose to the heater core. A switch is operationally coupled between the heating element and a power source of the vehicle such that actuation by the user of the switch provides the heating element with power.

Still yet another object of the present invention is to provide a new heater core preheater that would make the first few minutes in a cold vehicle more comfortable for the driver and the passengers. The pleasant temperature would allow the driver to concentrate on driving so accidents could be avoided.

Even still another object of the present invention is to provide a new heater core preheater that would allow the user to defrost the windows much faster than with a conventional heating system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
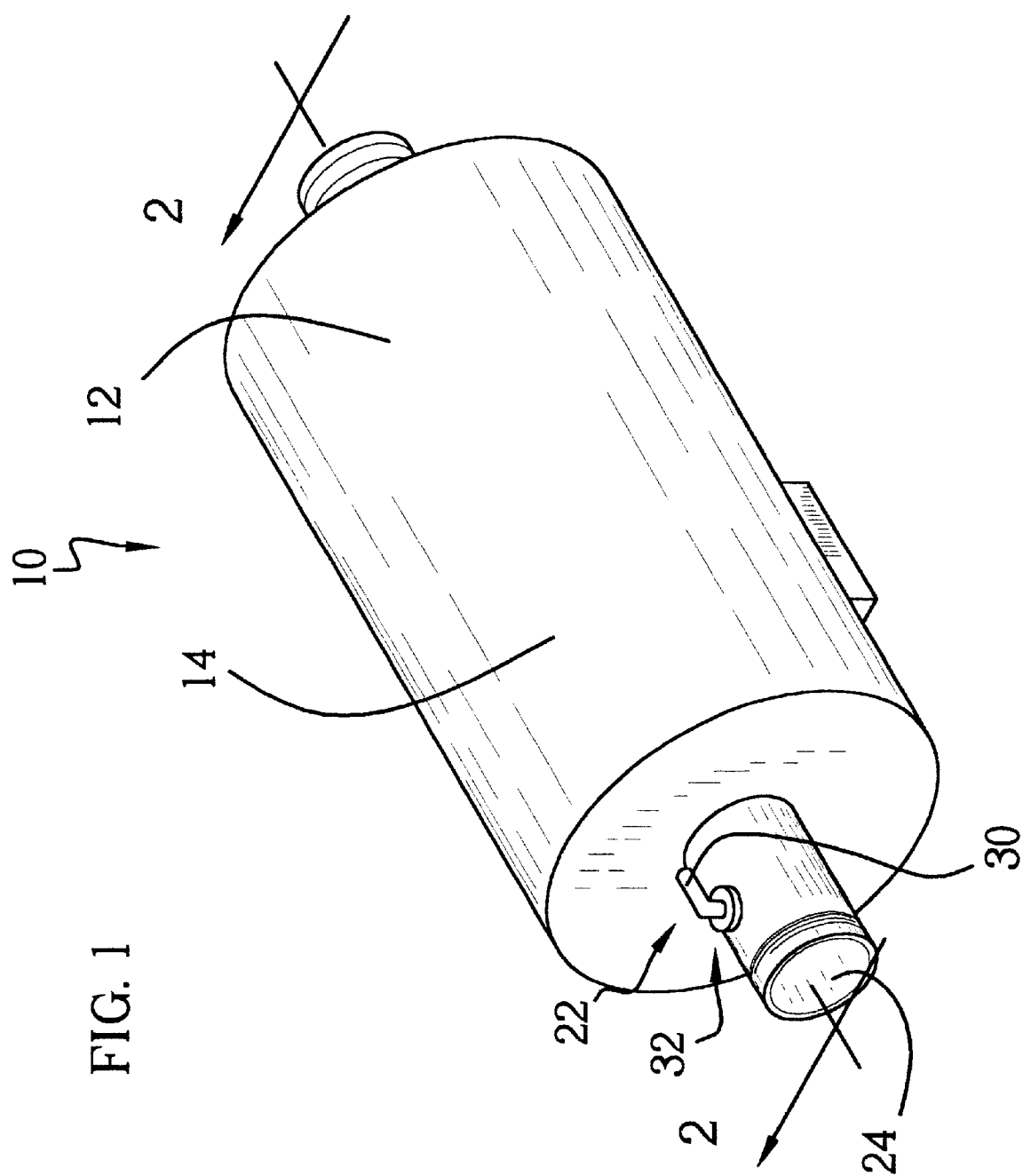
FIG. 1 is a perspective view of a new heater core preheater according to the present invention.
Figure 2:
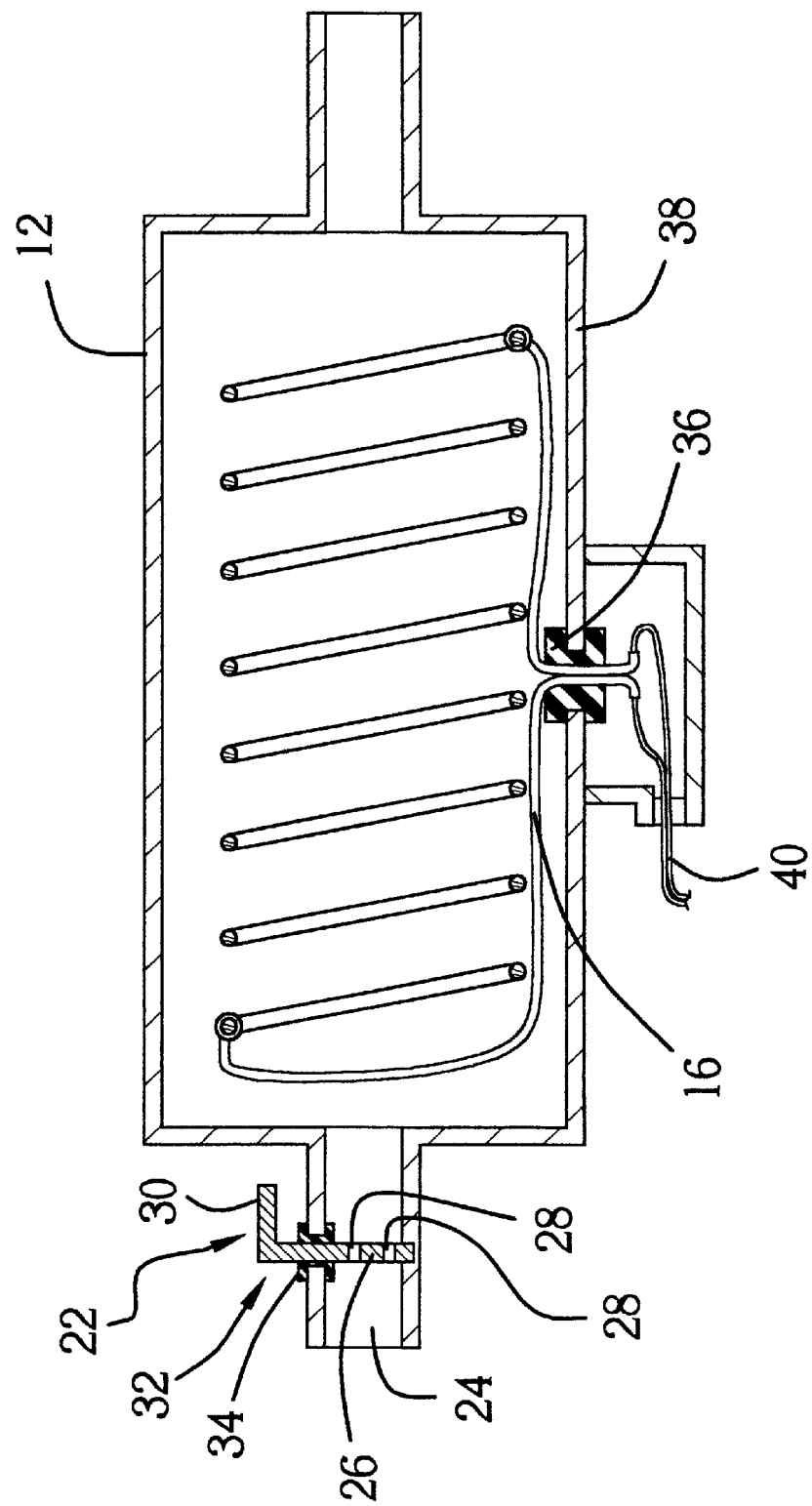
FIG. 2 is a cross-sectional view of the present invention.
Figure 3:
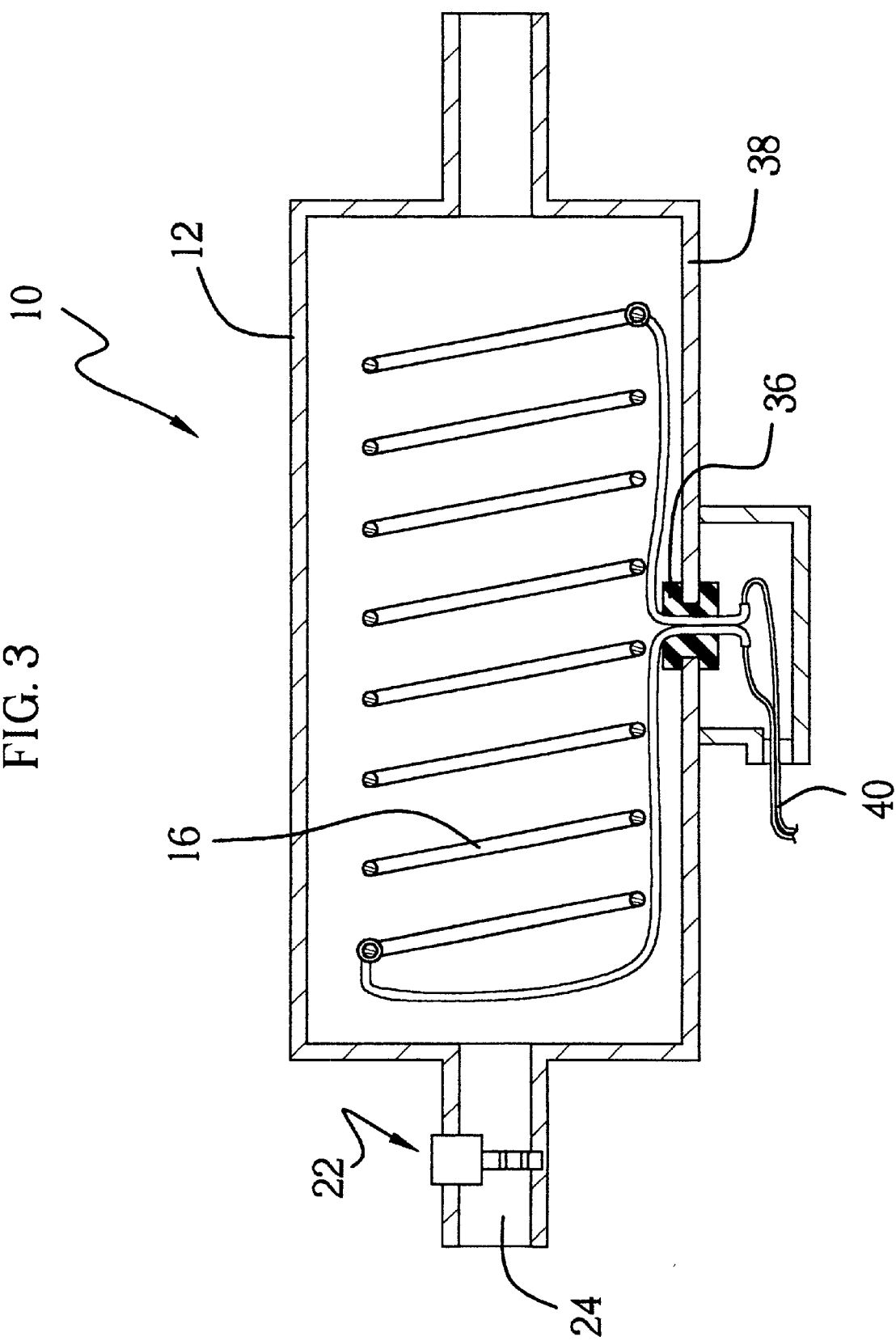
FIG. 3 is a cross-sectional view of the present invention.
Figure 4:
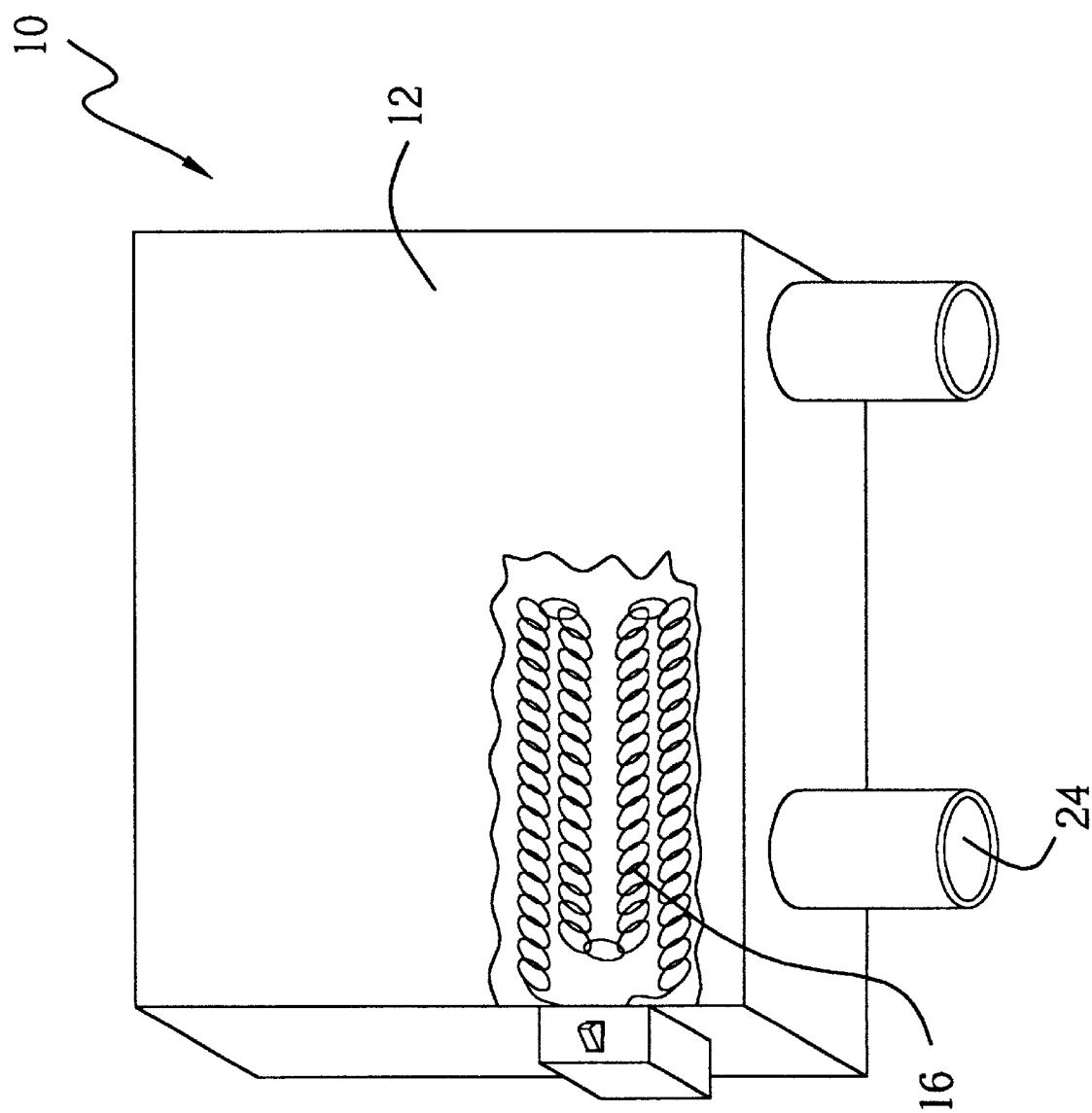
FIG. 4 is a perspective view of the present invention.
Figure 5:
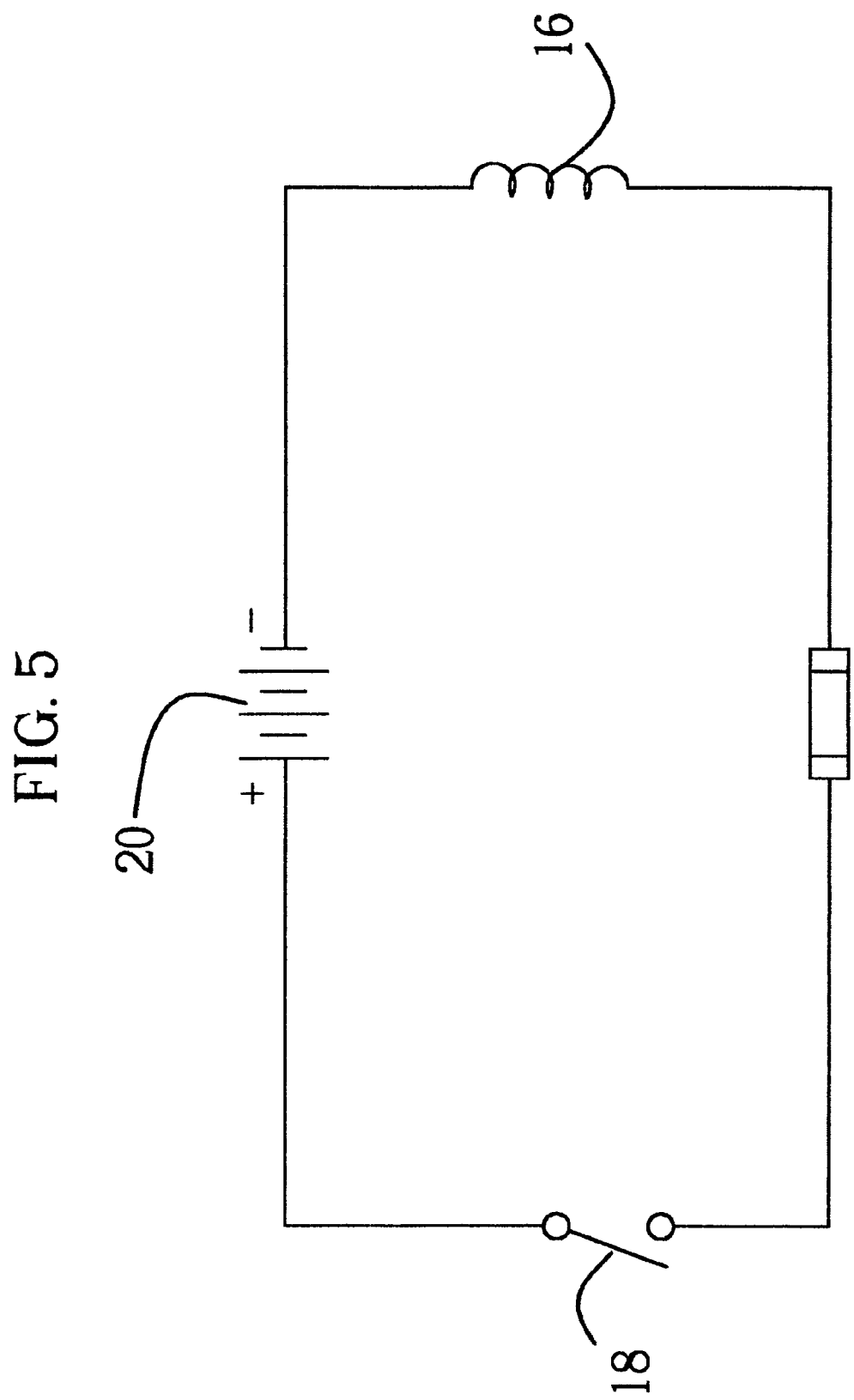
FIG. 5 is a schematic diagram of the present invention.

With reference now to the drawings, and in particular to FIGS. 1 through 5 thereof, a new heater core preheater embodying the principles and concepts of the present invention and generally designated by the reference numeral 10 will be described.

As best illustrated in FIGS. 1 through 5, the heater core preheater 10 generally includes a housing 12 that has a body portion 14 such that the housing 12 is adapted for coupling to a heater hose between an engine of the vehicle and an inlet of the heater core of the vehicle. A heating element 16 is coupled within the housing 12 such that the heating element 16 is adapted for heating fluid flowing through the heater hose to the heater core. A switch 18 is operationally coupled between the heating element 16 and a power source 20 of the vehicle such that actuation by the user of the switch 18 provides the heating element 16 with power.

A restrictor assembly 22 is rotatably coupled within an inlet port 24 of the housing 12 such that the restrictor assembly 22 is adapted for restricting flow of the fluid through the housing 12 whereby the heating is adapted for providing complete heating to the fluid flowing through the housing 12. The restrictor assembly 22 has a flap that is rotatably fitted within a lumen of the inlet port 24 of the housing 12. The rotation of the flap 26 perpendicular to an axis of the housing 12 is adapted for providing the greatest amount of restriction of the flow of the fluid through the housing 12. The flap 26 is rotatable to a position parallel to the axis of the housing 12 such that the flap 26 is adapted for providing a negligible amount of restriction to the flow of the fluid through the housing 12. The flap 26 of the restrictor assembly 22 has a plurality of apertures 28 through the flap 26. The flap 26 is adapted for permitting a reduced flow of the fluid through the housing 12 when the flap 26 is rotated perpendicular to the axis of the housing 12. The restrictor assembly 22 has an actuation arm 30 fixedly coupled to the flap 26. The actuation arm 30 extends through a wall of the inlet port 24 such that rotation of the actuating arm 30 rotates the flap 26 of the restrictor assembly 22.

An actuation assembly 32 is coupled to the actuation arm 30 of the restrictor assembly 22. The actuation assembly 32 is adapted for rotating the actuation arm 30 to rotate the flap 26 when the actuation assembly 32 reaches a predetermined condition.

An inlet grommet 34 is coupled to the housing 12 such that the inlet grommet 34 extends through the wall of the housing 12. The inlet grommet 34 is positioned to allow the actuation arm 30 to pass through the wall of the inlet port 24 such that the inlet grommet 34 is adapted for preventing the fluid from leaking from the inlet portion.

A housing grommet 36 is coupled through an outer wall 38 of the housing 12. The grommet is for allowing a pair of leads 40 operationally coupled to the heating element 16 to pass through the housing 12 whereby the housing grommet 36 is adapted for preventing the fluid from draining from the housing 12.

In use, the present invention would be used to warm coolant that is directed through the tubing. Wiring would be extended front the present invention to the vehicle's 12-volt power supply for operation. The present invention is manually controlled by a user for allowing a coolant to flow through the present invention so the heating coils would quickly warm the coolant.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for preheating fluid before the fluid enters a heater core of a vehicle that provides warm air for the occupants of the vehicle, said apparatus comprising:

a housing having a body portion such that said housing is adapted for coupling to a heater hose from an engine of the vehicle, said housing being adapted for coupling to an inlet of the heater core of the vehicle opposite the heater hose of the vehicle such that fluid from the engine enters said housing and then enters the heater core;

a heating element being coupled within said housing such that said heating element is adapted for heating fluid flowing through the heater hose to the heater core;

a switch being operationally coupled between said heating element and a power source of the vehicle such that actuation by the user of said switch provides said heating element with power; and a restrictor assembly being rotatably coupled within an inlet port of said housing such that said restrictor assembly is adapted for restricting flow of the fluid through said housing whereby said heating element is adapted for providing complete heating to the fluid flowing through said housing.

2. The apparatus as set forth in claim 1, wherein said restrictor assembly has a flap being rotatably fitted within a lumen of said inlet port of said housing such that rotation of said flap perpendicular to an axis of said housing is adapted for providing the greatest amount of restriction of the flow of the fluid through said housing, said flap being rotatable to a position parallel to said axis of said housing such that said flap is adapted for providing a negligible amount of restriction to the flow of the fluid through said housing.

3. The apparatus as set forth in claim 2, wherein said flap of said restrictor assembly has a plurality of apertures through said flap such that said flap is adapted for permitting a reduced flow of the fluid through the housing when said flap is rotated perpendicular to said axis of said housing.

4. The apparatus as set forth in claim 2, wherein said restriction assembly has an actuation arm fixedly coupled to said flap, said actuation arm extending through a wall of said inlet port such that rotation of said actuating arm rotates said flap of said restriction assembly.

5. The apparatus as set forth in claim 4, further comprising:

an actuation assembly coupled to said actuation arm of said restriction assembly, said actuation assembly being adapted for rotating said actuation arm to rotate said flap when said actuation assembly reaches a predetermined condition.

6. The apparatus as set forth in claim 4, further comprising:

an inlet grommet coupled to said housing such that said inlet grommet extends through said wall of said housing, said grommet being positioned to allow said actuation arm to pass through said wall of said inlet port such that said inlet grommet is adapted for preventing the fluid from leaking from said inlet portion.

7. The apparatus as set forth in claim 1, further comprising:

a housing grommet being coupled through an outer wall of said housing, said grommet being for allowing a pair of leads operationally coupled to said heating element to pass through said housing whereby said housing grommet is adapted for preventing the fluid from draining from said housing.

8. An apparatus for preheating fluid before the fluid enters a heater core of a vehicle that provides warm air for the occupants of the vehicle, said apparatus comprising:

a housing having a body portion such that said housing is adapted for coupling to a heater hose from an engine of the vehicle, said housing being adapted for coupling to an inlet of the heater core of the vehicle opposite the heater hose of the vehicle such that fluid from the engine enters said housing and then enters the heater core;

a heating element being coupled within said housing such that said heating element is adapted for heating fluid flowing through the heater hose to the heater core;

a switch being operationally coupled between said heating element and a power source of the vehicle such that actuation by the user of said switch provides said heating element with power;

wherein a restrictor assembly being rotatably coupled within an inlet port of said housing such that said restrictor assembly is adapted for restricting flow of the fluid through said housing whereby said heating is adapted for providing complete heating to the fluid flowing through said housing;

wherein said restrictor assembly has a flap being rotatably fitted within a lumen of said inlet port of said housing such that rotation of said flap perpendicular to an axis of said housing is adapted for providing the greatest amount of restriction of the flow of the fluid through said housing, said flap being rotatable to a position parallel to said axis of said housing such that said flap is adapted for providing a negligible amount of restriction to the flow of the fluid through said housing;

wherein said flap of said restrictor assembly has a plurality of apertures through said flap such that said flap is adapted for permitting a reduced flow of the fluid through the housing when said flap is rotated perpendicular to said axis of said housing;

wherein said restriction assembly has an actuation arm fixedly coupled to said flap, said actuation arm extending through a wall of said inlet port such that rotation of said actuating arm rotates said flap of said restriction assembly;

wherein an actuation assembly coupled to said actuation arm of said restriction assembly, said actuation assembly being adapted for rotating said actuation arm to rotate said flap when said actuation assembly reaches a predetermined condition;

wherein an inlet grommet coupled to said housing such that said inlet grommet extends through said wall of said housing, said grommet being positioned to allow said actuation arm to pass through said wall of said inlet port such that said inlet grommet is adapted for preventing the fluid from leaking from said inlet portion; and wherein a housing grommet being coupled through an outer wall of said housing, said grommet being for allowing a pair of leads operationally coupled to said heating element to pass through said housing whereby said housing grommet is adapted for preventing the fluid from draining from said housing.

9. An apparatus for preheating fluid before the fluid enters a heater core of a vehicle that provides warm air for the occupants of the vehicle, said apparatus comprising:

a housing having a body portion such that said housing is adapted for coupling to a heater hose from an engine of the vehicle, said housing being adapted for coupling to an inlet of the heater core of the vehicle opposite the heater hose of the vehicle such that fluid from the engine enters said housing and then enters the heater core;

a heating element being coupled within said housing such that said heating element is adapted for heating fluid flowing through the heater hose to the heater core;

a switch being operationally coupled between said heating element and a power source of the vehicle such that actuation by the user of said switch provides said heating element with power; and a housing grommet being coupled through an outer wall of said housing, said grommet being for allowing a pair of leads operationally coupled to said heating element to pass through said housing whereby said housing grommet is adapted for preventing the fluid from draining from said housing.

* * * * *